Feb. 7, 1950

J. C. TRAVILLA, JR 2,496,829

RAILWAY TRUCK STRUCTURE

Filed April 24, 1947

INVENTOR
JAMES C. TRAVILLA JR.
BY Rodney Bedell
ATTORNEY

Patented Feb. 7, 1950

2,496,829

UNITED STATES PATENT OFFICE 2,496,829

RAILWAY TRUCK STRUCTURE

James C. Travilla, Jr., Swarthmore, Pa., assignor to General Steel Castings Corporation, Granite City, Ill., a corporation of Delaware Application April 24, 1947, Serial No. 743,511

7 Claims. (Cl. 105—190)

The invention relates to railway trucks and more particularly to bolster locking devices for preventing vertical separation of the truck bolster and the truck frame.

Truck bolster locking devices as used heretofore have been so constructed that when the bolster is to be removed from the remaining truck structure, either the locking device must first be removed from beneath the truck or the bolster must be removed downwardly from the truck. In some railway cars the centerplate height is relatively low and the clearances below the bolster are restricted so that unless the truck is placed over a pit it is practically impossible to remove the locking device, or the bolster with the locking device, from below the truck. Therefore when cars having trucks with low centerplates are placed on a rip track where the truck to be repaired can be run from under the car body, the most suitable bolster locking arrangement is one in which the locking device and truck bolster can be removed from the top of the truck.

Furthermore it is desirable that the bolster locking device be of minimum weight and of economical construction. The locking device should also meet clearance conditions between the underside of the car body and the truck. The device should also meet A. A. R. recommendations which require that the locking device develop the full tensile strength of the body and truck centerplate connection so as to prevent vertical separation of the truck bolster and the truck frame in the event of derailment.

One object of the invention is to provide a truck bolster locking device which is especially adapted for use on cars where the clearances between the underside of the car body and the top of the truck are restricted and which includes locking members removable from the top of the truck to effect separation of the bolster and truck frame, and which provides a locking device of minimum weight and of economical construction.

Another object is to provide for removing the bolster from the top of the truck after removal of the locking members.

Another object is to remove the locking members without removing the brake balance hanger support plates.

Another object is to provide a bolster locking device which has a shear value at least as great as the tensile strength of the locking center pin which connects the truck center plate to the body center plate.

Another object is to provide a compact bolster locking device having sufficient strength to meet A. A. R. specifications.

Another object is to adapt the locking device to a channel shaped bolster.

Other objects will be apparent to those skilled in the art from the following description and accompanying drawings in which.

Figure 1:
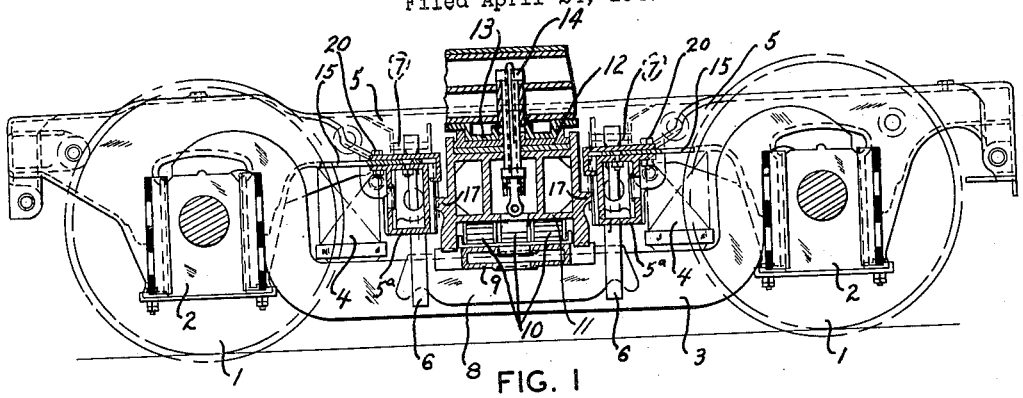
Figure 1 is a central longitudinal vertical section of a railway truck including a locking device constructed according to the invention.
Figure 2:
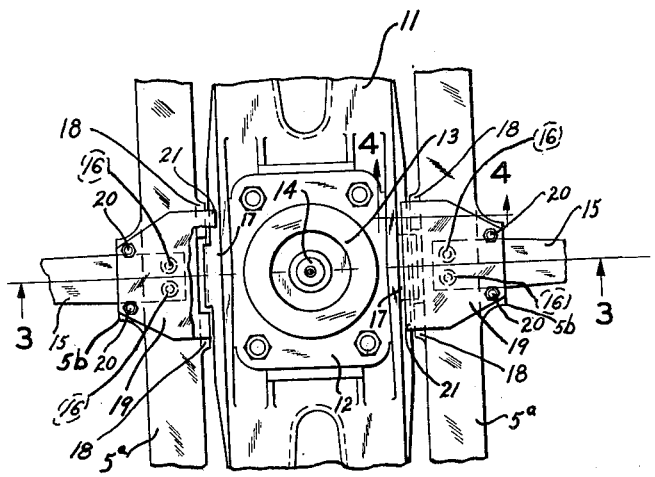
Figure 2 is a detail top view of the central part of the truck drawn to enlarged scale and showing the locking device which consists of elements on the truck bolster and on the truck frame transoms. A portion of one of the removable locking elements on the transom is broken away to better illustrate an associated element integral with the transom.
Figure 3:
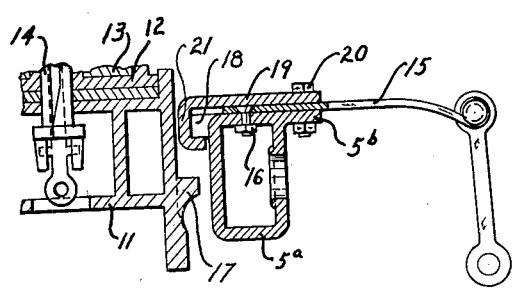
Figure 3 is a detail longitudinal vertical section taken approximately on the line 3—3 of Figure 2 and shows the locking device and associated brake balance hanger support plate and hanger.
Figure 4:
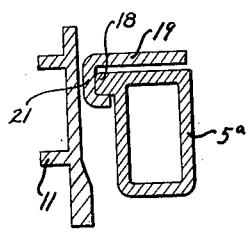
Figure 4 is a detail vertical section taken approximately on the line 4—4 of Figure 2.

The truck includes wheel and axle assemblies 1 and journal boxes 2 which support equalizers 3 mounting truck springs 4 which carry a truck frame 5 having spaced transoms 5a. The truck is of the lateral motion bolster type and has pairs of swing hangers 6 at opposite sides of the truck pivotally suspended from frame 5 by pins 7. Each pair of hangers 6 has a cross bar 8 which supports the adjacent end of a spring plank 9. Near the ends of spring plank 9 are mounted leaf springs 10 which support between the transoms a bolster 11 of channel shaped construction having a center plate 12 on which is rotatably mounted the body center plate 13 by a vertical locking center pin 14. The car body (not shown) is mounted on the body center plate 13.

A brake balance hanger support plate 15 is attached by bolts 16 to the center of each transom and extends longitudinally of the truck.

The bolster locking device includes a lug 17 formed integrally with the bolster at the center of each of its sides and extending toward the adjacent transom 5a. Each transom has a pair of lugs 18 at its inner top corner extending toward the bolster. Lugs 18 are spaced laterally of the truck from one another to permit bolster lug 17 to move vertically between them without interference when the bolster is removed from the truck frame. Each transom 5a has an extension 5b at its side opposite lugs 18.

A separate locking member 19 is attached to each transom 5a by bolts 20 through extension 5b. Bolts 20 are spaced apart sufficiently to receive between them the associated brake balance hanger support plate 15, whereby the locking member may be removed without removing the associated plate. Member 19 extends over the top of the transom and has a hook-like part 21 which fits over and under transom lugs 18. Part 21 extends laterally of the truck from one transom lug to the other and overlies the adjacent bolster lug 17. Vertical separation of the frame and bolster is prevented when the locking members 19 are assembled to the transoms and such separation may occur only when the locking members are removed therefrom.

Locking members 19 are readily removable from the top of the truck and without detaching the brake balance hanger supports. The bolster then may be removed from the top of the truck also. By providing transom lugs 18 and a hook-like part 21 on locking member 19 in engagement therewith, locking member 19 and bolts 20 may be of relatively light-weight material and be of sufficient strength to meet A. A. R. specifications. The locking device is adapted for use with a channel-shaped bolster and has a shear value at least as great as the tensile strength of the pin which connects the truck center plate with the body center plate.

The device may be varied substantially according to the details of construction without departing from the spirit of the invention, and the exclusive use of those modifications coming within the scope of the claims is contemplated.

What is claimed is:

1. In a railway truck, a truck frame having spaced transoms, a bolster therebetween, a lug at the side of said bolster extending toward the adjacent transom, and a locking member removably attached to said adjacent transom and extending beneath an integral part of said transom and toward said bolster with a portion extending over the bolster lug to limit upward movement of said bolster relative to the frame by the resistance of the lugs to shear.

2. In a railway truck, a truck frame having a transom member, a bolster member extending alongside thereof, lug-like structure rigid with the side of each of said members and extending toward the other of said members, at least one of said structures comprising elements spaced apart laterally of the truck to pass between them the other structure when said bolster member is lifted from said frame, and a locking element detachably secured to one of said members extending laterally of the truck and overlying the lug structure on said bolster member and underlying the lug structure on said transom member to limit upward movement of said bolster member relative to said transom member.

3. In a railway truck, a truck frame having spaced transoms, a broke balance hanger support attached to each of said transoms at the longitudinal center line of the truck, a bolster mounted between said transoms and arranged for movement vertically relative to said frame, a rigid lug at each side of said bolster at the longitudinal center line of the truck and extending toward the adjacent transom, a detachable locking member on each transom overlying the brake balance hanger support and extending toward the bolster and having a portion overlying the adjacent bolster lug to limit vertical movement of said bolster and transom, and removable elements detachably securing said locking members to said transoms and providing for removal of said locking members without removing said supports.

4. In a railway truck, a truck frame including a transom, a bolster, a lug projecting from a side of the bolster toward the transom, lugs on the transom spaced laterally of the truck from one another to pass between them the bolster lug when said bolster is removed from said frame, and a separate locking member attached to said transom and having a part engaging the underside of the transom lugs and extending laterally of the truck from one lug to the other and having a portion overlying the bolster lug to prevent vertical separation of the frame and bolster.

5. In a railway truck, a truck frame including spaced transoms, a bolster having a lug at each of its sides, lugs on each transom spaced laterally of the truck from one another to pass between them the associated bolster lug when said bolster is removed from said frame, and a separate locking member attached to each of said transoms and having a hook-like part fitting over and under the transom lugs and having a portion extending laterally of the truck from one lug to the other so as to overlie the associated bolster lug to prevent vertical separation of the frame and bolster.

6. In a railway truck, a truck frame including spaced transoms, a bolster suspended between said transoms and arranged for vertical movement relative to said frame, a lug at the center of each side of said bolster extending toward the adjacent transom, a pair of lugs on each transom extending towards said bolster and spaced laterally of the truck to pass between them the associated bolster lug when said bolster is removed from said frame, an extension on each transom opposite said transom lugs, a detachable locking member on each transom attached to said extension and extending over the top of the transom and having a hook-like part fitting over and under the transom lugs and extending laterally of the truck from one lug to the other and having a portion overlying the associated bolster lug to prevent vertical separation of the frame and bolster.

7. In a railway truck, a truck frame having spaced transoms, a bolster therebetween, a lug at the side of said bolster extending toward the adjacent transom, a locking member, and means for securely attaching said locking member to said transom, said transom having an element thereon for engagement with said locking member, said locking member extending over said bolster lug and having engagement with said transom element whereby upward movement of said bolster relative to said truck frame is resisted by said element and independently of said attaching means.

JAMES C. TRAVILLA, JR.

REFERENCES CITED

The following references are of record in the file of this patent:

UNITED STATES PATENTS

| Number | Name | Date |
|---|---|---|
| 975,475 | Stevens | Nov. 15, 1910 |
| 1,029,582 | Beasley | June 18, 1912 |
| 1,831,722 | Shannon | Nov. 10, 1931 |
| 2,044,576 | Kjolseth | June 16, 1936 |
| 2,127,935 | Pflager et al. | Aug. 23, 1938 |
| 2,238,593 | Kjolseth | Apr. 15, 1941 |